(12) United States Patent
Wozniak et al.

(10) Patent No.: US 8,385,329 B2
(45) Date of Patent: Feb. 26, 2013

(54) METHOD AND SYSTEM OF VOICE CARRY OVER FOR INSTANT MESSAGING RELAY SERVICES

(75) Inventors: Louis Joseph Wozniak, Carmel, IN (US); David Michael Claus, Carmel, IN (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 382 days.

(21) Appl. No.: 12/627,397

(22) Filed: Nov. 30, 2009

(65) Prior Publication Data

US 2011/0128953 A1 Jun. 2, 2011

(51) Int. Cl.
*H04L 12/66* (2006.01)
(52) U.S. Cl. .......................................... 370/352; 379/52
(58) Field of Classification Search .................. None
See application file for complete search history.

(56) References Cited

U.S. PATENT DOCUMENTS

| | | | |
|---|---|---|---|
| 5,521,960 A * | 5/1996 | Aronow ........................... 379/52 |
| 5,974,116 A | 10/1999 | Engelke et al. |
| 7,142,642 B2 | 11/2006 | McClelland et al. |
| 7,200,208 B2 | 4/2007 | Smith, Jr. et al. |
| 7,245,705 B2 | 7/2007 | Stephens et al. |
| 2003/0016657 A1 * | 1/2003 | Creamer et al. ............... 370/352 |
| 2005/0086699 A1 * | 4/2005 | Hahn et al. ..................... 725/106 |
| 2005/0094775 A1 * | 5/2005 | Smith et al. .................... 379/52 |
| 2006/0285652 A1 * | 12/2006 | McClelland et al. ........... 379/52 |
| 2008/0260113 A1 * | 10/2008 | Jean et al. .................. 379/88.13 |

* cited by examiner

*Primary Examiner* — Yong Zhou

(57) ABSTRACT

A method of assisting communication for a user is provided. The method includes receiving an IM message including a request for a voice carry over from the user, and transmitting to the user an invitation to join a first voice connection. The method further includes initiating the first voice connection with the user, and initiating a second voice connection with a recipient. Additionally, the method includes communicating to the recipient a first voice communication from the user over the first and second voice connections, and communicating to the user a response IM message including a transcribed version of a second voice communication from the recipient. An apparatus for assisting communication for a user is provided. A computer-readable medium having stored thereon computer-executable instructions is provided. The computer-executable instructions cause a processor to perform a method when executed.

20 Claims, 4 Drawing Sheets

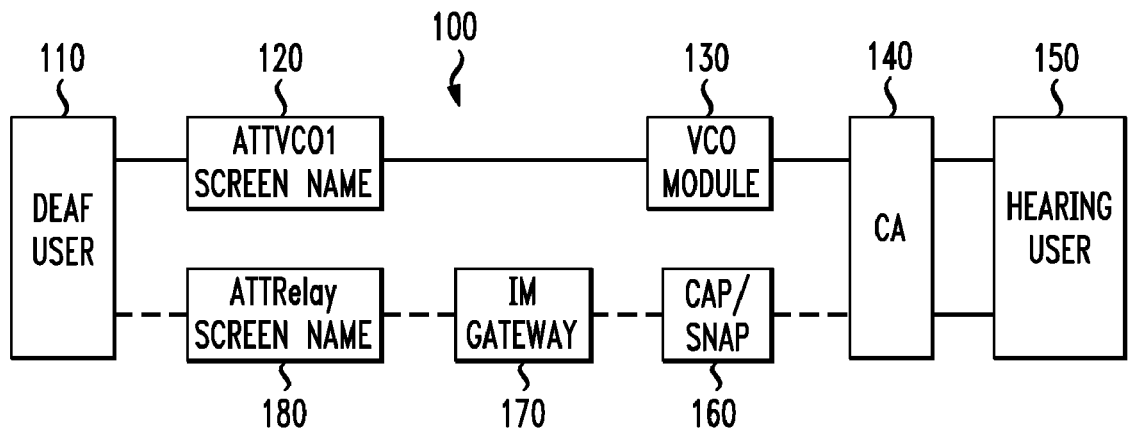
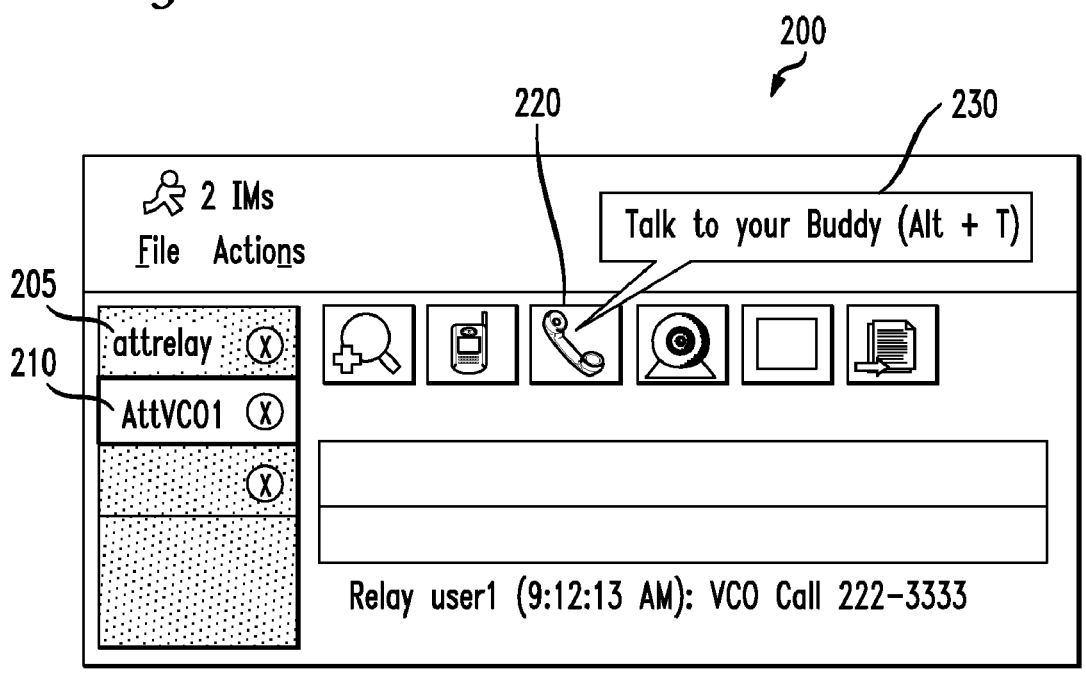

METHOD AND SYSTEM OF VOICE CARRY OVER FOR INSTANT MESSAGING RELAY SERVICES

FIELD OF THE INVENTION

The system and method of the present application relates to communication services for deaf or hearing-impaired persons, and in particular relates to a voice carry over (VCO) relay and a hearing carry over (HCO) relay. In particular, the system and method provided relates to an instant messaging relay system in including VCO and HCO.

BACKGROUND OF THE INVENTION

Relay services provide deaf and hearing impaired people the ability to make phone calls. A deaf customer types what they wish to say to the person they are calling (also referred to as the recipient or the far party), and the relay communications assistant (CA) voices the text to the hearing party being called. When the hearing party speaks, the CA types what they say for transmission to a screen for the deaf caller to read.

Many deaf or hearing impaired users can speak and want the ability to talk instead of type for their outgoing part of the conversation. The only part of relay they require or desire is the translation of the other party's voice into text that they can read. This 'one-way' relay is known as voice carry over (VCO).

SUMMARY OF THE INVENTION

Instant messaging relay (IM Relay) allows users to communicate through an instant messaging system, for instance AOL Instant Messenger (AIM), to hearing users. An IM system may allow voice transport. The AIM user may simply press (ALT+T) to turn on voice communication. IM Relay allows a deaf or hearing impaired user to type instant messages (IM messages) to a CA and have the CA speak the typed communications to a recipient. The recipient then speaks to the CA, who transcribes the words of the recipient and sends the transcription in an IM message to the deaf or hearing impaired person. Conventional IM Relay, however, does not support VCO calls. As a new feature, IM Relay could route this voice transmission to the hearing customer, thus creating IM VCO.

A method of assisting communication for a user is provided. The method includes receiving an IM message including a request for a voice carry over from the user, and transmitting to the user an invitation to join a first voice connection. The method further includes initiating the first voice connection with the user, and initiating a second voice connection with a recipient. Additionally, the method includes communicating to the recipient a first voice communication from the user over the first and second voice connections, and communicating to the user a response IM message including a transcribed version of a second voice communication from the recipient.

These and other advantages of the invention will be apparent to those of ordinary skill in the art by reference to the following detailed description and the accompanying drawings.

BRIEF DESCRIPTION OF THE DRAWINGS

FIG. 1 illustrates a system according to an exemplary embodiment;

FIG. 2 illustrates a screen shot for an exemplary embodiment;

DETAIL DESCRIPTION

Figure 3:
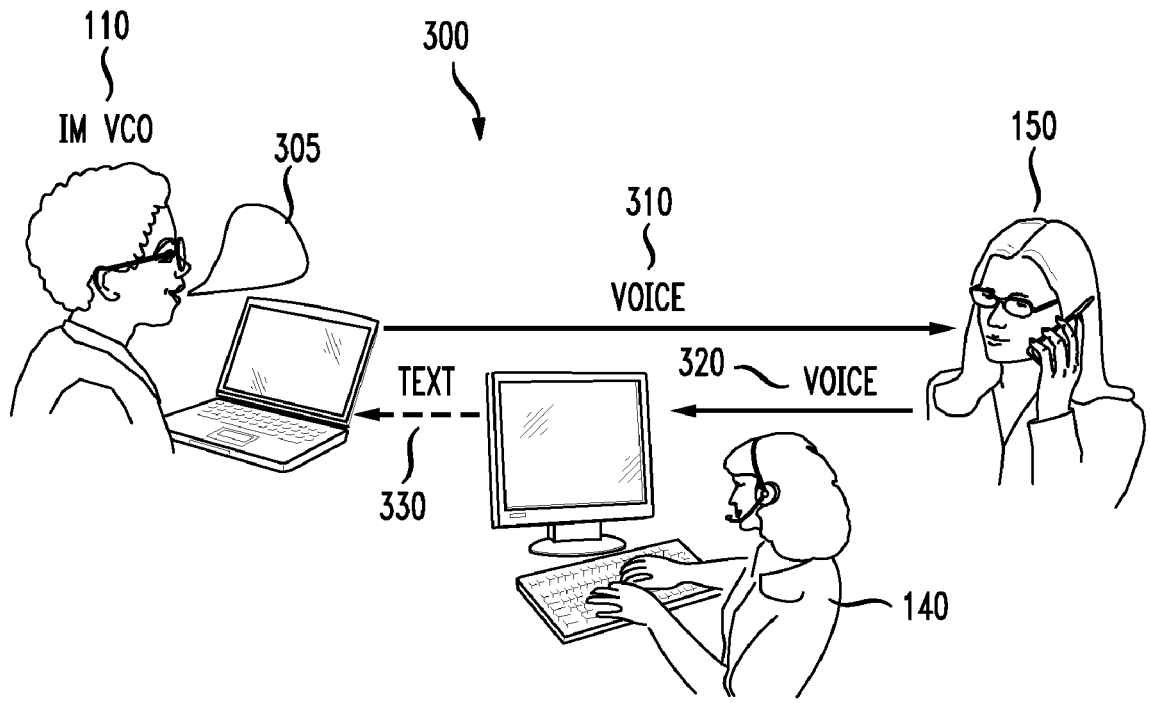
FIG. 3 illustrates schematically a system according to an exemplary embodiment.

FIG. 1 illustrates a system according to an exemplary embodiment. In FIG. 1, solid lines may represent voice or text communications, and dashed lines represent text communications. System 100 operates to provide communication services for deaf user 110. Deaf user 110 may be completely deaf, or alternatively, hearing impaired.

Deaf user 110 may desire to initiate a telephone call with hearing user 150. Deaf user 110 may use a personal computer or other electronic device to send an instant message to screen name 120, for instance "ATTVC01", which may represent the screen name of a communication assistant able to conduct voice carry over calls. The instant message may be sent to initiate the voice carry over call from deaf user 110 to hearing user 150. The instant message sent to screen name 120 may be routed to, or activate, VCO module 130. VCO module 130 may be a stand-alone computer, a mini laptop, or another processor. VCO module 130 may interact with communication assistant (CA) 140. CA 140 may be a personal computer (PC) or another terminal, or may represent a person operating such a PC or terminal.

CA 140 opens a voice link with deaf user 110 by sending an invitation to deaf user 110. CA 140 may interact with CAP/SNAP 160, which may be a master computer for the relay services system. CAP/SNAP 160 may communicate with IM gateway 170, which may send an instant message from screen name 180, for instance "ATTRelay" to deaf user 110. Screen name 180 may represent a screen name of the communication assistance operating a text portion of the relay. After deaf user 110 responds in the affirmative to the instant message invitation for the voice component of the voice carry over, an audio link may be formed between CA 140 and deaf user 110. CA 140 may then complete a voice call to hearing user 150. The voice call from CA 140 to hearing user 150 may be a two way voice communication on a public telephone network (for instance a public switched telephone network (PSTN)), or alternatively may be a VoIP phone call on the internet. During the phone call, deaf user 110 may communicate by voice through VCO module 130 and CA 140 to hearing user 150, and hearing user 150 may communicate by voice with CA 140. CA 140 may transcribe the voice communications of hearing user 150 and send the transcribed voice communications via CAP/SNAP 160 and IM gateway 170 to deaf user 110 from screen name 180.

FIG. 2 illustrates a screen shot of an exemplary system. Screen shot 200 is for a screen name "Relay user1" representing a user. Screen shot 200 identifies two other screen names with which the user may communicate by IM, namely "attrelay" 205 and "AttVCO1" 210. Both "attrelay" 205 and "AttVCO1" 210 may represent a communication assistant able to assist the user with a relay, voice carryover, hearing carryover, or captioned call. The user presented with screen shot 200 may have the option to select voice carry over initiation button 220. Additionally, initiation button 220 may include hypertag 230 which pops up when a cursor or other selector passes over, or hovers over, initiation button 220. After activating VCO initiation button 220, a VCO relay phone call may be conducted.

FIG. 3 illustrates schematically a voice carry over (VCO) system 300 according to an exemplary embodiment. Deaf user 110 may be able to speak and prefer to communicate by voice directly to hearing user 150. Therefore, deaf user 110 may communicate speech 305 that is received at a microphone to become voice communication 310. Voice communication 310 may be transmitted to hearing user 150 via CA 140. When hearing user 150 communicates to deaf user 110, hearing user 150 speaks creating voice communication 320. Voice communication 320 is heard by CA 140, who transcribes the content of voice communication 320. CA 140 then sends text 330, comprising the transcribed content of voice communication 320, by IM message to deaf user 110.

Figure 4:
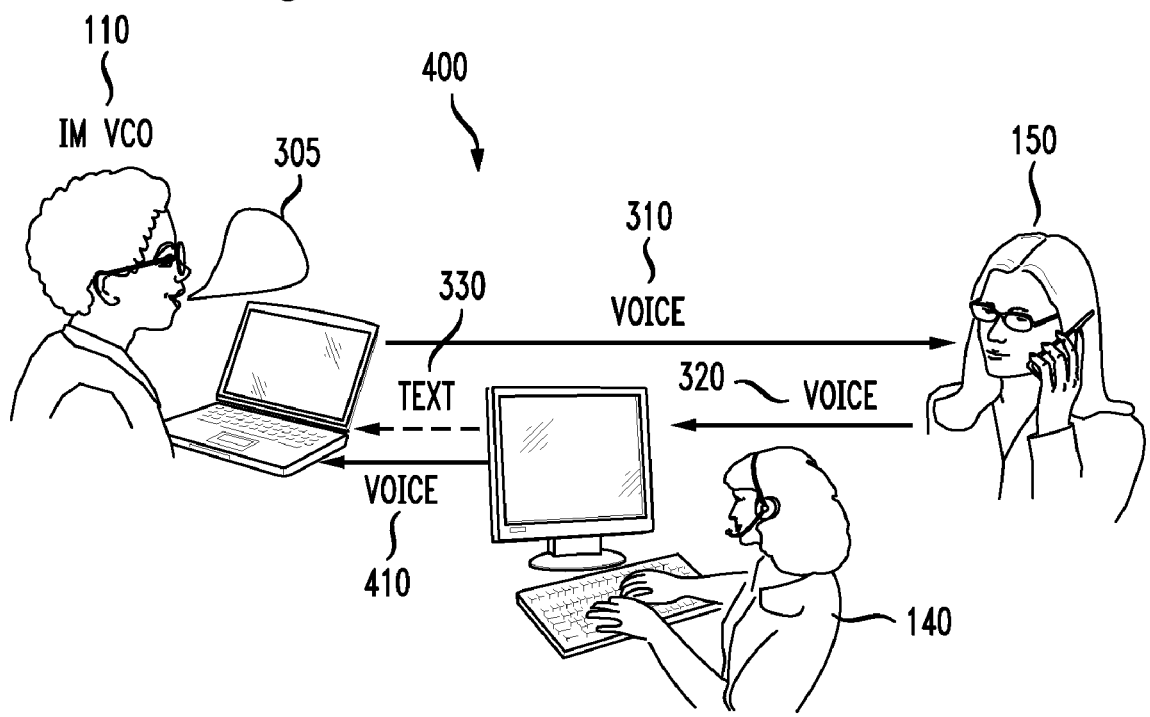
FIG. 4 illustrates schematically a system according to another exemplary embodiment.

FIG. 4 illustrates an alternative embodiment including a hearing carry over (HCO) system 400 (also referred to as a caption system). HCO system 400 may be helpful for a hearing impaired person who wants to hear the person with whom they are speaking, but who also requires a transcription of the voice communication. Deaf user 110 (who may, as discussed above, be merely hearing impaired) may communicate speech 305 creating voice communication 310, which is transmitted to hearing user 150. Alternatively, voice communication 310 may be a text communication in the case of a user who does not want to, or is unable to, speak. Hearing user 150 may communicate by voice communication 320 to CA 140, in the same manner as FIG. 3. Additionally, in the same manner as FIG. 3, CA 140 may transcribe voice communication 320 to create text communication 330 for communication to deaf user 110 by an instant messaging system. However, in addition, voice communication 410 may be transmitted by CA 140 to deaf user 110. Voice communication 410 may be identical to voice communication 320, and may merely be a continuation of voice communication 320.

The system discussed above in regard to FIG. 4, in which deaf user 110 communicates by text to hearing user 150, and voice communication 410, but not text communication 330, is provided to deaf user 110, is conventionally described as hearing carry over. The system discussed above in which deaf user 110 communicates by voice communication 310 to hearing user 150, and voice communication 410 and text communication 330 are provided to deaf user 110, is conventionally described as captioning.

Figure 5:
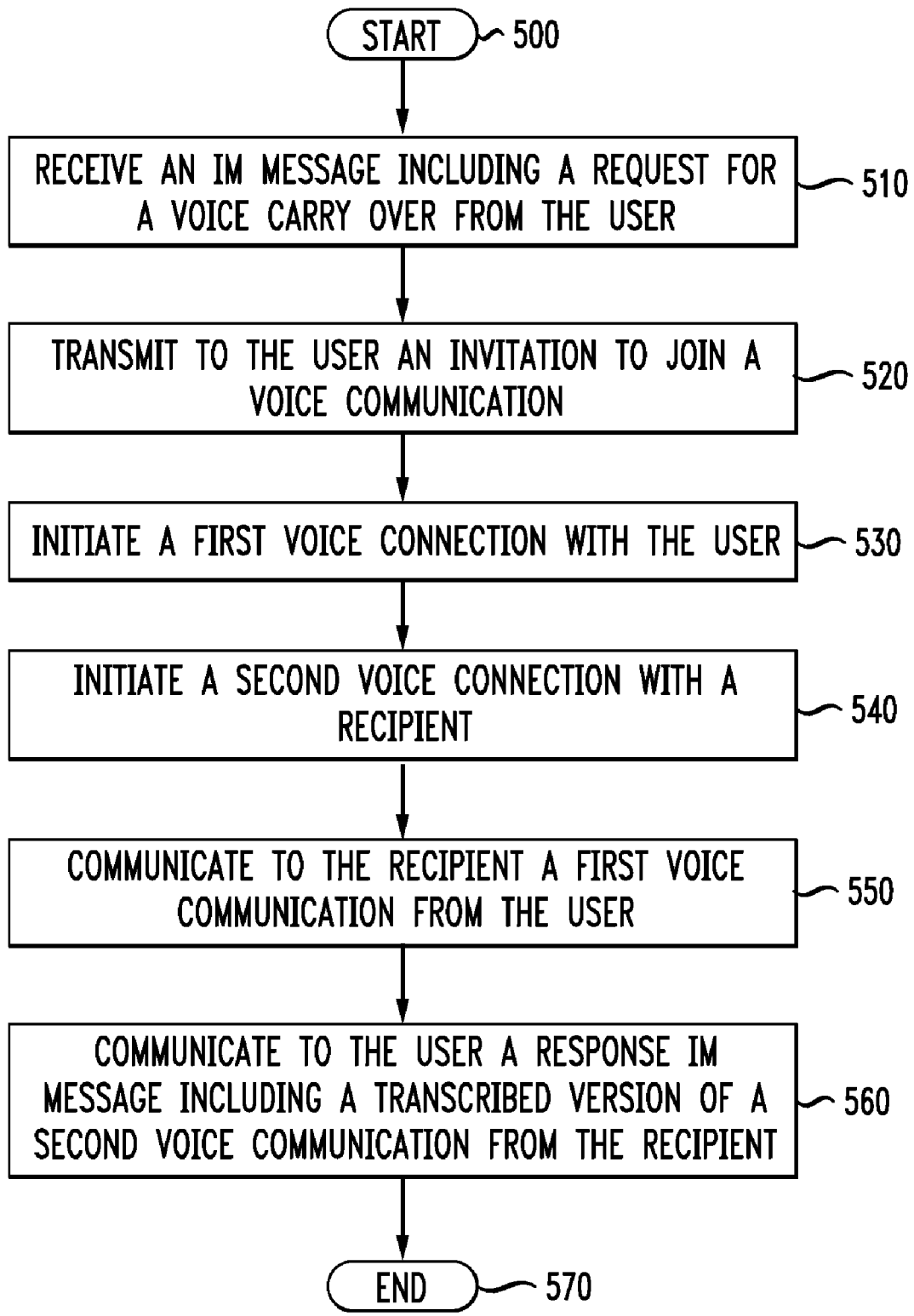
FIG. 5 illustrates a method according to an exemplary embodiment.

FIG. 5 illustrates a method according to an exemplary embodiment. The flow of the method shown in FIG. 5 starts in start circle 500. The flow proceeds from start circle 500 to operation 510, which receives an IM message including a request for a voice carry over from the user. The user may be deaf or hearing impaired, and the request may be directed to a communication assistant (CA). From operation 510, the flow proceeds to operation 520, which transmits to the user an invitation to join a voice communication. An additional step in the method may provide for accepting by the user of the invitation from the communication assistant to join the voice communication. From operation 520, the flow proceeds to operation 530, which initiates a first voice communication with the user. From operation 530, the flow proceeds to operation 540, which initiates a second voice communication with a recipient. From operation 540, the flow proceeds to operation 550, which communicates to the recipient a first voice communication from the user. From operation 550, the flow proceeds to operation 560, which communicates to the user a response IM message including a transcribed version of a second voice communication from the recipient. From operation 560, the flow proceeds to end circle 570.

An exemplary method may further include accepting by a user the invitation to join the first voice connection. The initiating of the first voice connection with the user may be performed by a communication assistant, and the initiating of the second voice connection with the recipient may be performed by the communication assistant.

The IM message may further include a request for a hearing carry over to the user, and the method may further include communicating to the user the second voice communication from the recipient.

The first voice connection with the user may be over an IM voice functionality or over a VoIP connection. The second voice connection with the recipient may be over a telephone connection or over a VoIP connection.

The method may further include accepting an initiation of an IM communication from the user. The initiation of the IM communication may be the same message as the initial IM message from the deaf or hearing impaired user to the communication assistant, or may precede the receiving of the IM message.

Figure 6:
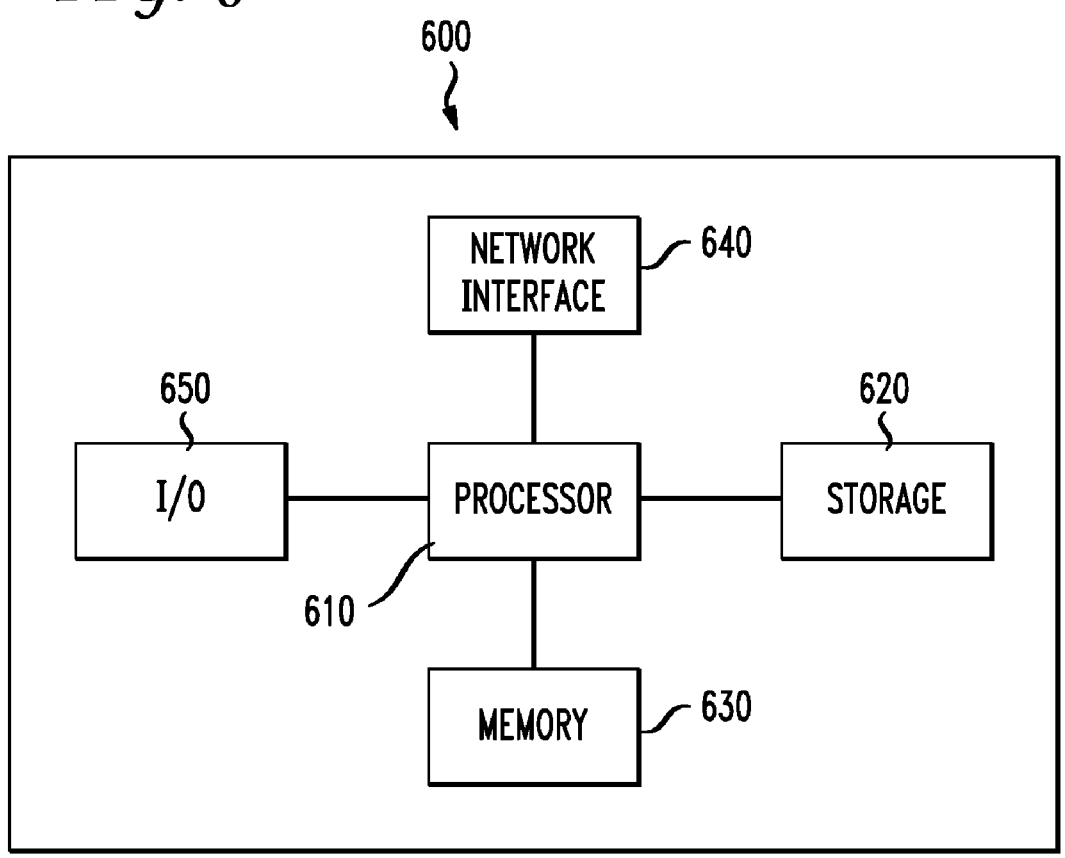
FIG. 6 is a block diagram of a computer in accordance with an exemplary embodiment.

FIG. 6 is a high level block diagram of a computer in accordance with an embodiment of the present invention. Computer 600 can, for example, operate as VCO module 130, a terminal operated by CA 140, CAP/SNAP 160, or any other terminal. Additionally, computer 600 can perform the steps described above (e.g., with respect to FIG. 5). Computer 600 contains processor 610 which controls the operation of computer 600 by executing computer program instructions which define such operation, and which may be stored on a computer-readable recording medium. The computer program instructions may be stored in storage 620 (e.g., a magnetic disk, a database) and loaded into memory 630 when execution of the computer program instructions is desired. Thus, the computer operation will be defined by computer program instructions stored in memory 630 and/or storage 620 and computer 600 will be controlled by processor 610 executing the computer program instructions. Computer 600 also includes one or more network interfaces 640 for communicating with other devices, for example other computers, servers, or websites. Network interface 640 may, for example, be a local network, a wireless network, an intranet, or the Internet. Computer 600 also includes input/output 650, which represents devices which allow for user interaction with the computer 600 (e.g., display, keyboard, mouse, speakers, buttons, webcams, etc.). One skilled in the art will recognize that an implementation of an actual computer will contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method of assisting communication for a user, comprising:

receiving, by a communication assistant selected by the user, an initial instant message comprising a text message and a request for a voice carry over from the user, wherein the instant message is received after selection by the user of an instant message voice functionality selectable in an instant message client application associated with the user, and after a selection of the communication assistant by the user from a plurality of communication assistants displayed by the instant message client application;
transmitting to the user an invitation to join a first voice connection;
initiating the first voice connection with the user;
initiating a second voice connection with a recipient;
communicating to the recipient a first voice communication from the user over the first and second voice connections; and
communicating to the user a response instant message including a transcribed version of a second voice communication from the recipient.

2. The method of claim 1, further comprising accepting by the user the invitation to join the first voice connection.

3. The method of claim 1, wherein
the initiating the first voice connection with the user is performed by the communication assistant; and
the initiating the second voice connection with the recipient is performed by the communication assistant.

4. The method of claim 1, further comprising:
communicating to the user the second voice communication from the recipient.

5. The method of claim 1, wherein the first voice connection with the user is over the instant message voice functionality.

6. The method of claim 1, wherein the first voice connection with the user is over a VoIP connection.

7. The method of claim 1, wherein the second voice connection with the recipient is over a telephone connection.

8. The method of claim 1, wherein the second voice connection with the recipient is over a VoIP connection.

9. The method of claim 1, further comprising accepting an initiation of an instant message communication from the user.

10. An apparatus, comprising:
a memory storing computer program instructions; and
a processor communicatively coupled to the memory, the processor to execute the computer program instructions, which, when executed on the processor, cause the processor to perform operations comprising:
receiving, by a communication assistant selected by the user, an initial instant message comprising a text message and a request for a voice carry over from the user, wherein the instant message is received after selection by the user of an instant message voice functionality selectable in an instant message client application associated with the user, and after a selection of the communication assistant by the user from a plurality of communication assistants displayed by the instant message client application;
transmitting to the user an invitation to join a first voice connection;
initiating the first voice connection with the user;
initiating a second voice connection with a recipient;
communicating to the recipient a first voice communication from the user over the first and second voice connections; and
communicating to the user a response instant message including a transcribed version of a second voice communication from the recipient.

11. The apparatus of claim 10, the operations further comprising accepting by the user the invitation to join the first voice connection.

12. The apparatus of claim 10, wherein:
the communication assistant initiates the first voice connection with the user; and
the communication assistant initiates the second voice connection with the recipient.

13. The apparatus of claim 10, the operations further comprising:
communicating to the user the second voice communication from the recipient.

14. The apparatus of claim 10, wherein the first voice connection with the user utilizes the instant message voice functionality.

15. The apparatus of claim 10, wherein the first voice connection with the user utilizes a VoIP connection.

16. The apparatus of claim 10, wherein the second voice connection with the recipient utilizes a telephone connection.

17. The apparatus of claim 10, wherein the second voice connection with the recipient utilizes a VoIP connection.

18. The apparatus of claim 10, the operations further comprising accepting an initiation of an instant message communication from the user.

19. A non-transitory computer readable medium storing computer program instructions, which, when executed on a processor of a communication assistant selected by a user, cause the processor to perform operations comprising:
receiving an initial instant message comprising a text message and a request for a voice carry over from the user, wherein the instant message is received after selection by the user of an instant message voice functionality selectable in an instant message client application associated with the user, and after a selection of the communication assistant by the user from a plurality of communication assistants displayed by the instant message client application;
transmitting to the user an invitation to join a first voice connection;
initiating the first voice connection with the user;
initiating a second voice connection with a recipient;
communicating to the recipient a first voice communication from the user; and
communicating to the user a response instant message including a transcribed version of a second voice communication from the recipient.

20. The non-transitory computer-readable medium of claim 19, the operations further comprising accepting by the user the invitation to join the first voice connection.

* * * * *